United States Patent [19]
Riedel

[11] 3,817,487
[45] June 18, 1974

[54] CAST MOLD OF CU—SN—NI ALLOY
[75] Inventor: John Y. Riedel, Bethlehem, Pa.
[73] Assignee: James H. Bateman, Bethlehem, Pa.
[22] Filed: Jan. 8, 1973
[21] Appl. No.: 321,927

[52] U.S. Cl. ................... 249/135, 75/154, 148/3
[51] Int. Cl. ............................................. B29c 1/02
[58] Field of Search ........... 249/135; 75/154; 148/3, 148/32.5, 160

[56] References Cited
UNITED STATES PATENTS
1,816,509  7/1931  Wise .............................. 75/154 X
FOREIGN PATENTS OR APPLICATIONS
294,233  10/1929  Great Britain ..................... 75/154
OTHER PUBLICATIONS
Nichols, "Use of Beryllium Copper in Plastic Molds," India Rubber World, April, 1952, pp 80–81.

Primary Examiner—J. Spencer Overholser
Assistant Examiner—John E. Roethel
Attorney, Agent, or Firm—William B. Noll

[57] ABSTRACT

This disclosure covers a copper base alloy mold suitable for making plastic parts. More particularly, it relates to a mold cast from an alloy consisting essentially of, by weight percent, about 6.0 to 20.0 percent tin, about 8.0 to 12.0 percent nickel, preferably no more than about 10.0 percent nickel, and the balance copper. In the as-cast condition, the mold is characterized by a hardness between about BHN 145 and 275, and a molding surface which faithfully reproduces the surface detail of the original part or pattern.

9 Claims, 2 Drawing Figures

PATENTED JUN 18 1974 3,817,487

CAST MOLD OF CU—SN—NI ALLOY

BACKGROUND OF THE INVENTION

This invention relates to a copper alloy mold consisting essentially of, by weight, about 6.0 to 20.0 percent tin, about 8.0 to 12.0 percent nickel, with the balance copper. This combination and critical proportions of elements result in an alloy having the desirable features required for as-cast molds for making plastic parts.

Molds used for making plastic parts function essentially by providing a cavity having the final part configuration to receive the hot plastic compound, and to resist damage thereby. Further, the mold must be such as to extract heat from the plastic part so as to permit ejection from the mold without permanent deformation of the part. As a consequence, in order to obtain high or repetitive production therefrom, one of the most important requirements of a mold is that it have high thermal conductivity.

The thermal conductivity characteristic of copper has long been recognized, even in the plastic molding industry. For example, even when steel molds are aided by water cooling systems, approximately three to four times as many plastic parts can be made in copper molds. However, despite this apparent advantage, there are some shortcomings in the use of copper.

In this regard, copper lacks sufficient castability to make fine detail molds. If used, machining or other shaping operations may be needed. Further, the hardness of as-cast copper is not high enough to resist mechanical damage and wear to the mold during normal production use.

Recognizing both the advantages and disadvantages in the use of copper, the logical next step for the prior art practioners was to search for alloys of copper which possessed castability and hardness. This search led to the development of the Cu—Be alloys, containing by weight from about 1.0 to 2.0 percent beryllium, balance copper. In the as-cast form, the Cu—Be alloys have a hardness ranging between about BHN 80 to 100 — a significant increase over as-cast copper whose hardness is about BHN 38. However, it was discovered that the Cu—Be alloys were susceptible to age hardening heat treatment operations, namely, solution quenching followed by precipitation hardening, so that selected hardnesses ranging between about BHN 100 to 300 could be developed. Although the alloys have the capabilities of responding to heat treatment, it was found in practice that few molds were actually heat treated. Most of them were being used in the as-cast condition. Thus, the need was still present for an as-cast alloy mold having the necessary characteristics. Such was discovered in the alloy mold of this invention.

SUMMARY OF THE INVENTION

This invention covers a copper alloy mold suitable for making plastic parts, containing critical amounts of tin and nickel for the development of optimum properties. More specifically, said alloy consists essentially of, by weight, about 6.0 to 20.0 percent tin, about 8.0 to 12.0 percent nickel, preferably a maximum of about 10.0 percent nickel, with the balance copper. In the as-cast condition, said mold is characterized by a hardness, which is in direct relationship to the tin content, ranging between about BHN 145 and 275. In addition, the casting surface reproduces with great fidelity the surface detail originally present on the pattern so that the plastic cast thereagainst also develops this detail.

DETAILED DESCRIPTION OF PREFERRED EMBODIMENT

Figure 1:
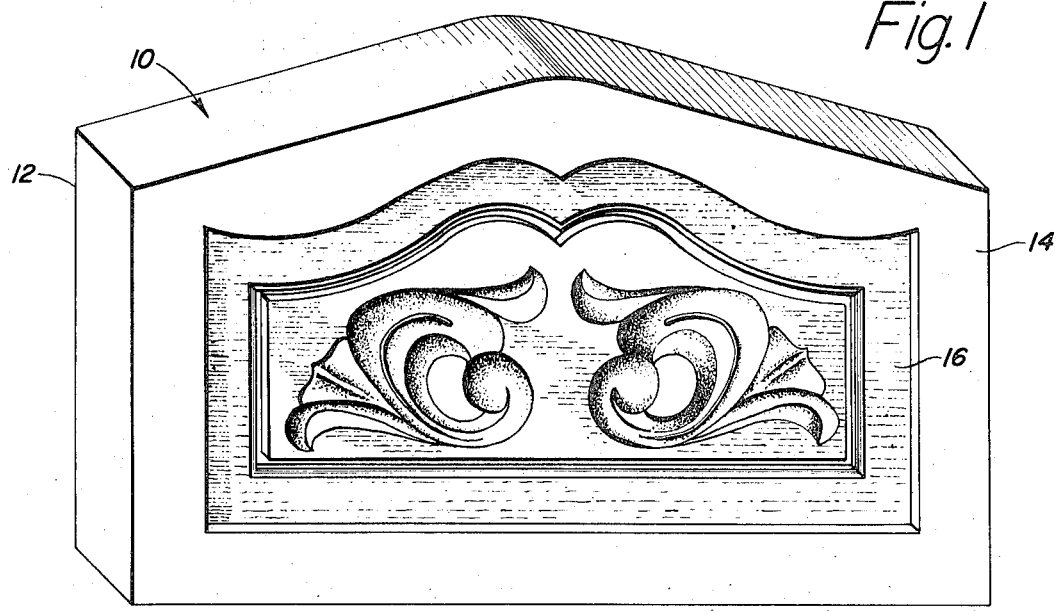
FIG. 1 is a perspective view of a typical mold cast from the alloy of this invention.

In the practice of this invention, a means is provided for controlling the level of hardness of a copper alloy mold in the as-cast condition thereby eliminating the need for a hardening post heat treatment. For convenience, and without intending to unduly restrict the invention, a typical mold made from the alloy herein is shown in FIG. 1.

Said mold 10 is characterized by a base 12 having an upstanding peripheral edge 14 defining a central cavity 16 into which the hot plastic material is inserted. If desirable, conduits or passageways may be provided in said base 12 for transmitting a coolant, such as water, to aid in extracting heat therefrom. While several methods may be available for making detailed molds such as illustrated in FIG. 1, a preferred method includes fashioning a pattern of the part to be ultimately cast from wood or other material which can be shaped or cut to give the intricate details desired. About such a part, a rubberized replica mold is cast using a quick-setting liquid rubber. In appearance, the rubberized replica mold is identical to the copper alloy mold. Into the rubber mold, ceramic material is cast to produce a duplicate of the original part. The final step involves casting the copper alloy into the cavity of the ceramic form, which when separated therefrom, reveals a mold in the manner of FIG. 1.

Figure 2:
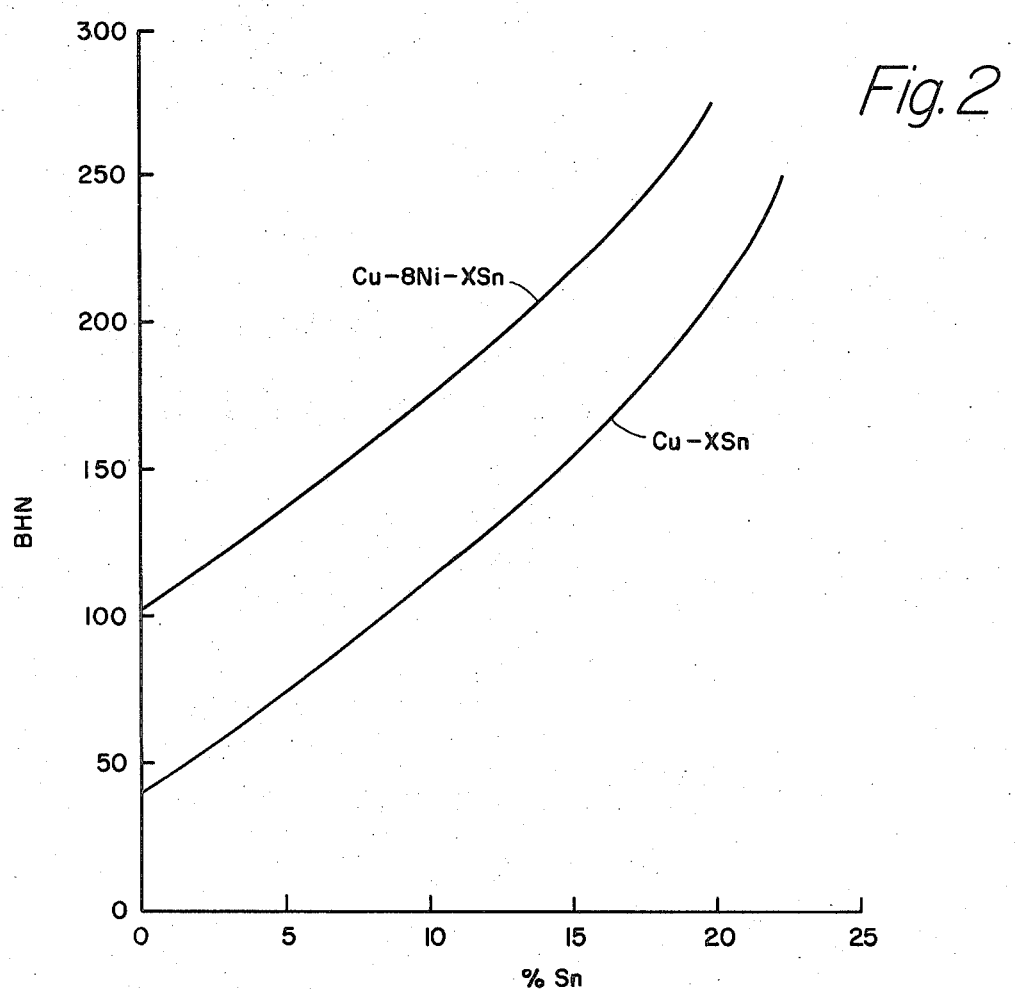
FIG. 2 is a graph showing the relationship of hardness to tin content in an 8Ni—Cu Series alloys, within which are mold alloys of this invention, and a series of binary alloys of copper and tin.

Turning now to a further consideration of the alloy used in the mold of this invention, it will be seen from FIG. 2 that the addition of tin to copper has a significant effect on the hardness of the resultant alloy. More specifically, a Cu—Sn binary alloy is being compared to the Cu—Sn—Ni alloy of this invention. It will be observed that the hardness of the Cu—Sn alloys also varies directly with the tin therein. It might thus be assumed that a simple Cu—Sn alloy would suffice to meet the requirements or needs of the plastic molding industry. However, it is not so simple, as Cu—Sn binary alloys containing more than about 9.0 percent tin, by weight, are so brittle that they are unsuitable for molds.

It will be appreciated that the molds to which this invention is directed are typically characterized by thick walled sections adjacent to medium or thin walled sections. As a result of the casting of such a mold, stresses may be set up causing a warped or out-of-flat mold. In such a situation, it is necessary to straighten the said mold. Thus, a new requirement has been added to the suitability of a mold. A highly brittle alloy mold will crack or break if subjected to a flattening treatment. By way of example, if good thermal conductivity and hardness were the only requirements for molds, it would be possible to obtain the same approximate hardness in a Cu—17Sn alloy, as found in a Cu—10Sn—8Ni alloy (see FIG. 2). However, the former would not be suitable due to the brittleness thereof.

Through the discovery of the synergistic relationship of the three components of the mold alloy hereof, the problems noted above were avoided. Over and above other advantages which will be apparent hereinafter, the addition of nickel permitted the use of higher tin contents, above the limit of 9.0 percent, by weight.

During metallographic examination of copper alloys containing by weight from about 6.0 to 20.0 percent tin, at least 8.0 percent nickel was needed to form, under the cooling rates prevailing in the cooling of castings having sections of from 1 to 6 inches, a matrix structure of almost completely theta phase. With lesser amounts of nickel, down to zero, increasing amounts of the alpha phase would be found in the matrix. Where the two phases were found in the lean nickel Cu—Sn alloys, the theta phase was about 10 points harder on the Rockwell B scale. Thus, the addition of nickel to achieve a strong theta phase added the increment of hardness to the inherent hardness of the Cu—Sn alloy, without at the same time causing brittleness that would result if a given hardness was produced just by the tin content alone.

Over and above the cost considerations for increasingly higher nickel contents, it was discovered that as the nickel increases higher casting temperatures were needed. Coincident with this, the castability of the alloy decreased, that is, the ability to produce fine detail became more difficult. Thus, a maximum of 12.0 percent by weight nickel is desirable, while a maximum of 10.0 percent is preferred.

The development of an all theta matrix structure would not be expected on the basis of information known and published regarding copper alloys containing tin and nickel. For example, an alloy classified as ASTM Designation B292-56 (Cu—5Sn—5Ni—2Zn) is the only alloy of the copper-nickel-tin series in commercial use. The as-cast structure of this alloy shows only about 5 percent theta in the matrix, with a hardness of about BHN 75. Accordingly, this alloy is normally heat treated to about BHN 150 to 200.

Further, published phase diagrams for the copper-tin-nickel series alloys indicate that with 5 percent by weight tin, about 23 percent nickel, by weight, would be required to produce an all theta structure. On the other hand, at 10.0 percent tin, an estimated 30.0 percent nickel or higher would be required to produce an all theta matrix structure. This data may properly apply under equilibrium conditions, namely, infinitely slow cooling rates during casting. However, such data is not applicable herein, and is in fact contrary to that discovered in the present invention. In practice, where the copper alloys of this invention are cast in refractory or ceramic type molds, they cool at rates approximately 1° to 30° F per minute in the range of 1,900° to 1,400° F, for sections of 1 to 6 inches thickness. Thus, the as-cast crystalline structure of the alloy herein was not the type expected.

For the purpose of this invention, it is considered desirable to avoid the use of alloying elements which oxidize easily. Over and above the effects of said elements on the performance and properties of the mold, in restricting the alloys to the elements, copper-tin-nickel, said alloy can be melted and scrap remelted to a precise chemistry without chemical analysis control. That is, all of the three elements charged into the furnace are substantially completely recovered.

Zinc is one of the elements to be specifically avoided. The recovery of zinc during melting in most commercial furnaces is quite erratic, often 50 percent or less. Further, the avoidance thereof of zinc oxide facilitates the casting of molds that do not have entrapped oxide particles or dirt at the molding or cavity surface. For the same reasons noted above, manganese should be avoided — better chemistry control and surface quality.

As described previously, by the use of this invention, the hardness of the as-cast mold can be selected within the range of BHN 145 and 275 by the careful selection of the tin content according to FIG. 2. A preferred mold alloy within the ranges described previously is one containing 8.0 percent tin and 8.0 percent nickel, each by weight, with the balance copper, where said mold has an as-cast hardness of about BHN 160.

The hardnesses attainable with the mold alloys hereof can be broadened through heat treatment. For example, a lower hardness can be produced by annealing the cast mold within the range of 1,000° to 1,450° F., the higher temperatures yielding the lowest hardnesses. From the annealing temperature the mold may be air cooled or quenched. If hardnesses in excess of BHN 275 up to about BHN 400 are desired, the mold can first be annealed in the manner above, preferably at a temperature between about 1,400° to 1,450° F., followed by hardening or aging at a temperature between about 500° to 700° F. for 1 to 4 hours or longer. From the aging temperature, the mold is air cooled to room temperature.

To further illustrate the invention herein, a 902 lb. heat was made and three molds were cast having general dimensions as follows:
 a. two molds, 11 × 20 × 2 inches,
 b. one mold, 18 × 28 × 4 inches.

The furnace charge consisted of 465 lbs. of Cu—Sn ingots, 356 lbs. of Cu—Ni ingots, and 81 lbs. of Cu, and based on substantially complete recovery resulted in an alloy of Cu—8Sn—8Ni. The heat was melted down in about 2 hours and then purged with nitrogen to remove hydrogen. The heating thereof was continued to attain a casting or pouring temperature of about 2,100° F. The heat was poured into a ladle and skimmed to remove dross, whereupon it was deoxidized by the addition of 54 oz. of phosphorus-copper containing about 15% P. After holding for about 1 ½ minutes to insure completion of the deoxidation reaction, the molds were cast. After cooling, the alloy castings were stripped and one of the molds was out-of-straight by about 3/16 inch in the center. After straightening on a 35 ton press, the mold was flat and showed no cracks. The hardness thereof was tested and the results agreed well with the data of FIG. 2.

It will be appreciated that the foregoing description represents the preferred embodiments of this invention. Accordingly, no limitation is intended to be imposed herein except as set forth in the appended claims.

I claim:

1. An open face cast copper alloy mold for use in making plastic parts comprising a base having an upraised peripheral edge and a central cavity for receiving hot plastic therein, said mold having been cast from a molten alloy consisting essentially of, by weight, about 6.0 to 20.0 percent tin, about 8.0 to 12.0 percent nickel, balance copper, and cooled at a rate of about 1° to 30° F. per minute through the range of about 1,900° to 1,400° F., to exhibit a matrix structure of almost completely theta phase.

2. The mold of claim 1 wherein the maximum nickel content is about 10.0 percent.

3. The mold of claim 1 wherein said base is provided with a conduit for transmitting coolant therethrough.

4. The mold of claim 1 wherein said mold is annealed at a temperature between about 1,000° to 1,450° F.

5. The mold of claim 4 wherein said mold is annealed at a temperature above about 1,400° F., followed by a hardening treatment by heating to a temperature between about 500° to 700° F. for a period of time of at least 1 hour.

6. An open face cast copper alloy mold for use in making plastic parts, said mold characterized by a predetermined as-cast hardness between about BHN 145 and 275 and comprising a base having an upraised peripheral edge and a central cavity for receiving hot plastic therein, said mold having been cast from a molten alloy consisting essentially of, by weight, about 6.0 to 20.0 percent tin, about 8.0 to 12.0 percent nickel, balance copper, and cooled at a rate of about 1° to 30° F. per minute through the range of about 1,900° to 1,400° F., whereby said as-cast hardness is directly related to the said tin content.

7. The mold of claim 6 wherein the maximum nickel content is about 10.0 percent.

8. The mold of claim 6 wherein said base is provided with a conduit for transmitting coolant therethrough.

9. The mold of claim 6 wherein the as-cast crystalline structure comprises a matrix structure of almost completely theta phase.

* * * * *